US00RE50116E

(19) United States
(12) Reissued Patent
Mahrenholtz et al.

(10) Patent Number: US RE50,116 E
(45) Date of Reissued Patent: Sep. 10, 2024

(54) BASE MEMBER FOR AN ANCHOR ASSEMBLY AND METHOD OF USE

(71) Applicant: Black & Decker Inc., New Britain, CT (US)

(72) Inventors: Philipp Mahrenholtz, Frankfurt (DE); Manfred Droste, Limburg-Offheim (DE)

(73) Assignee: Black & Decker Inc., New Britain, CT (US)

(21) Appl. No.: 17/118,210

(22) Filed: Dec. 10, 2020

Related U.S. Patent Documents

Reissue of:
(64) Patent No.: 10,151,102
Issued: Dec. 11, 2018
Appl. No.: 15/437,955
Filed: Feb. 21, 2017

(30) Foreign Application Priority Data

Feb. 22, 2016 (EP) ..... 16156770

(51) Int. Cl.
*E04B 1/41* (2006.01)

(52) U.S. Cl.
CPC ..... *E04B 1/4121* (2013.01); *E04B 1/4171* (2013.01)

(58) Field of Classification Search
CPC ..... E04B 1/41; E04B 1/4114; E04B 1/4121; E04B 1/4164; E04B 1/4171; E04B 2/30;
(Continued)

(56) References Cited

U.S. PATENT DOCUMENTS 991,517 A 5/1911 Kennedy
1,052,149 A 2/1913 Kennedy
(Continued)

FOREIGN PATENT DOCUMENTS

DE 2400109 A1 7/1975
JP H02-027405 U 2/1990
(Continued)

OTHER PUBLICATIONS

Pirog, Pawel—Extended European Search Report—Jun. 28, 2016—6 pages—Munich.
(Continued)

*Primary Examiner* — William V Gilbert
(74) *Attorney, Agent, or Firm* — Harness, Dickey & Pierce, P.L.C.

(57) ABSTRACT

A base member for cooperating with a support member and at least one fixing member to form an anchor assembly mountable to a form board on which wet concrete may be poured during formation of a concrete substrate. The base member includes: a mounting portion for positioning the anchor assembly on the form board prior to inserting the fixing members into the form board; an aperture having first and second generally opposed ends, the first end being open to facilitate insertion of the support member into the aperture; and a barrier reconfigurable in use from a first configuration, in which the barrier restricts ingress of wet concrete into contact with the support member via the second end of the aperture, to a second configuration in which the barrier allows an object to extend via the second end of the aperture into contact with the support member.

52 Claims, 11 Drawing Sheets

(58) Field of Classification Search
CPC ..... E04G 21/1421; E04G 21/1841; E04G 21/185; F16B 7/042; F16M 13/027
USPC ..... 52/699–701
See application file for complete search history.

(56) References Cited

U.S. PATENT DOCUMENTS

| | | | | | |
|---|---|---|---|---|---|
| 1,416,433 | A | | 5/1922 | Ackerman | |
| 1,940,545 | A | | 12/1933 | Holmes | |
| 3,391,514 | A | | 7/1968 | Hall | |
| 3,405,497 | A | * | 10/1968 | McNair | E04B 1/4121 52/699 |
| 4,170,853 | A | * | 10/1979 | Kohaut | E04G 9/021 52/99 |
| 4,211,048 | A | * | 7/1980 | Naka | E04B 1/4121 411/427 |
| 4,261,598 | A | * | 4/1981 | Cornwall | F16L 5/02 52/220.8 |
| 4,368,606 | A | | 1/1983 | Hoshino | |
| 4,726,561 | A | | 2/1988 | Worzala, Jr. | |
| 5,468,105 | A | | 11/1995 | Iwamoto | |
| 6,135,687 | A | * | 10/2000 | Leek | F16B 31/028 411/10 |
| 6,240,697 | B1 | * | 6/2001 | Thompson | E04B 1/4121 52/698 |
| 8,590,247 | B2 | | 11/2013 | Cooke | |
| 8,813,446 | B2 | | 8/2014 | Sladojevic | |
| 9,062,452 | B2 | * | 6/2015 | Espinosa | E04B 1/4171 |
| 9,181,691 | B2 | | 11/2015 | Thompson | |
| 9,303,399 | B2 | * | 4/2016 | Espinosa | E04B 1/4114 |
| 9,394,706 | B2 | * | 7/2016 | Lin | E04G 15/04 |
| 9,567,741 | B2 | * | 2/2017 | Espinosa | E04B 1/4164 |
| 10,519,648 | B2 | | 12/2019 | Mahrenholtz et al. | |
| 2006/0137285 | A1 | | 6/2006 | Brown | |
| 2013/0067849 | A1 | | 3/2013 | Espinosa | |
| 2014/0026515 | A1 | | 1/2014 | Espinosa | |
| 2014/0157717 | A1 | | 6/2014 | Espinosa | |
| 2015/0096242 | A1 | | 4/2015 | Lin | |
| 2015/0184373 | A1 | | 7/2015 | Espinosa | |
| 2018/0163392 | A1 | * | 6/2018 | Spampatti | E04B 1/41 |
| 2020/0248444 | A1 | * | 8/2020 | Spampatti | E04G 15/04 |

FOREIGN PATENT DOCUMENTS

| | | | | | |
|---|---|---|---|---|---|
| JP | H05-023685 | Y | | 6/1993 | |
| JP | H11-0070514 | A | | 3/1999 | |
| JP | H11-0140991 | A | | 5/1999 | |
| KR | 10-2159759 | | * | 4/2020 | E04B 1/4121 |
| WO | WO-95/013436 | A1 | | 5/1995 | |
| WO | 2015-140969 | A1 | | 3/2013 | |

OTHER PUBLICATIONS

Pirog, Pawel—Extended European Search Report—Jun. 12, 2017—6 pages—European Patent Office—Munich.

* cited by examiner

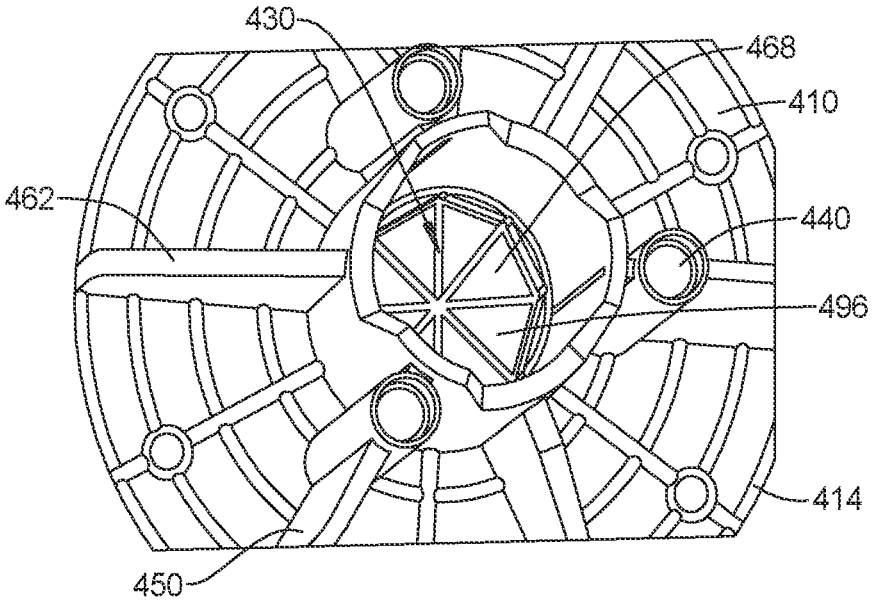
FIG. 14
Amended
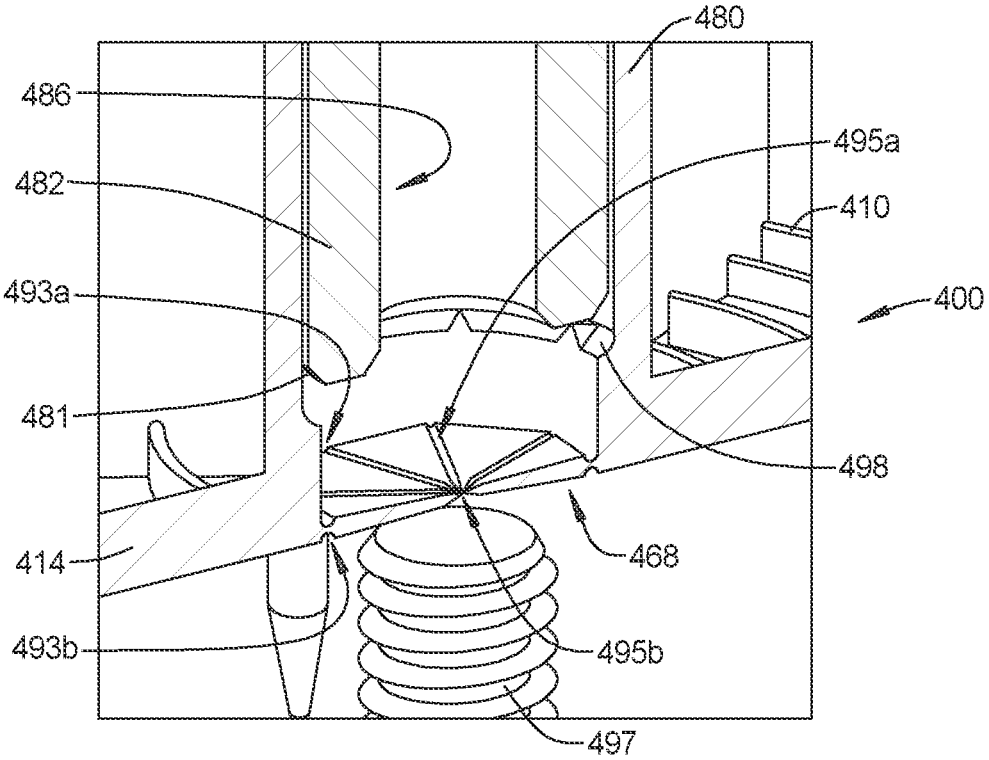
FIG. 15
Amended

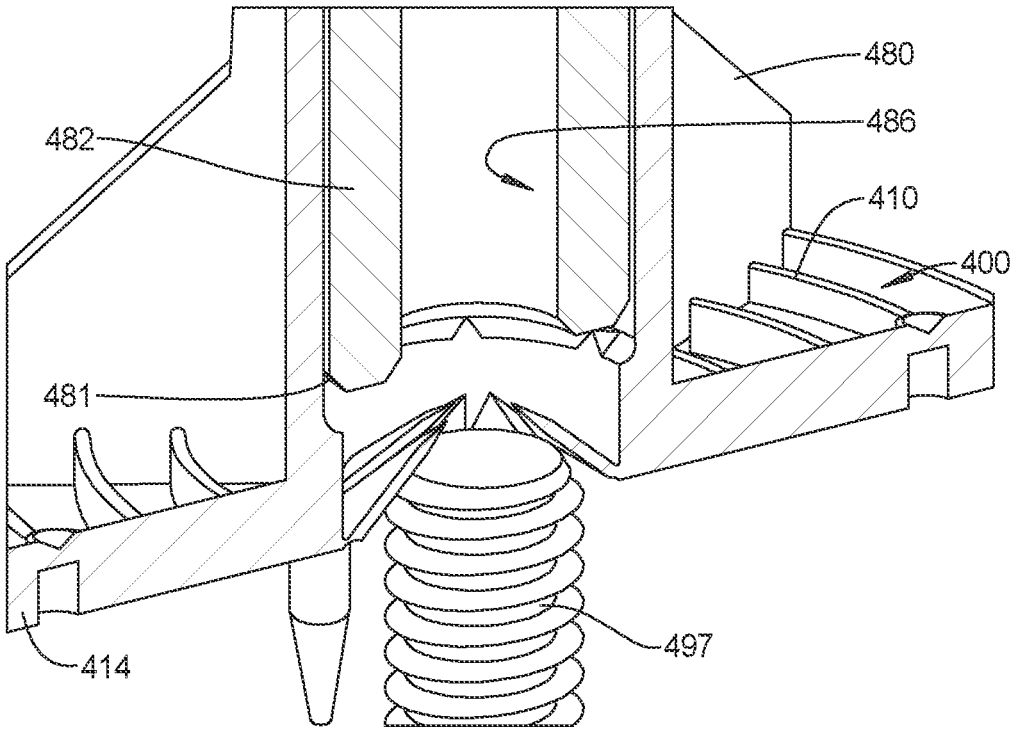
FIG. 16
Amended
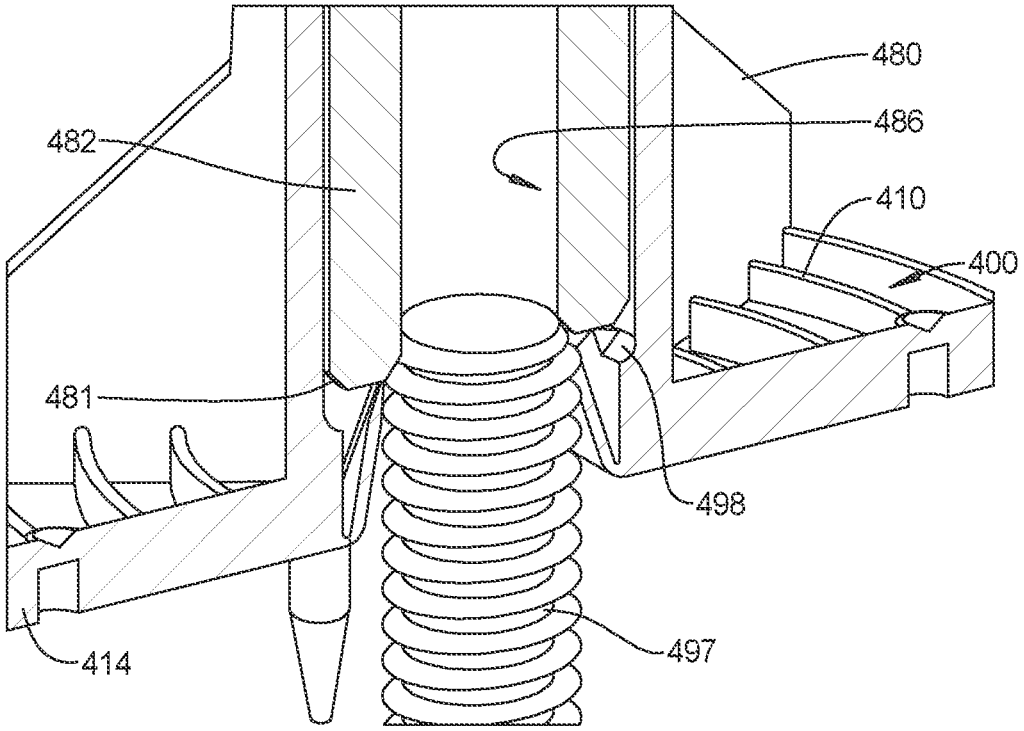
FIG. 17
Amended

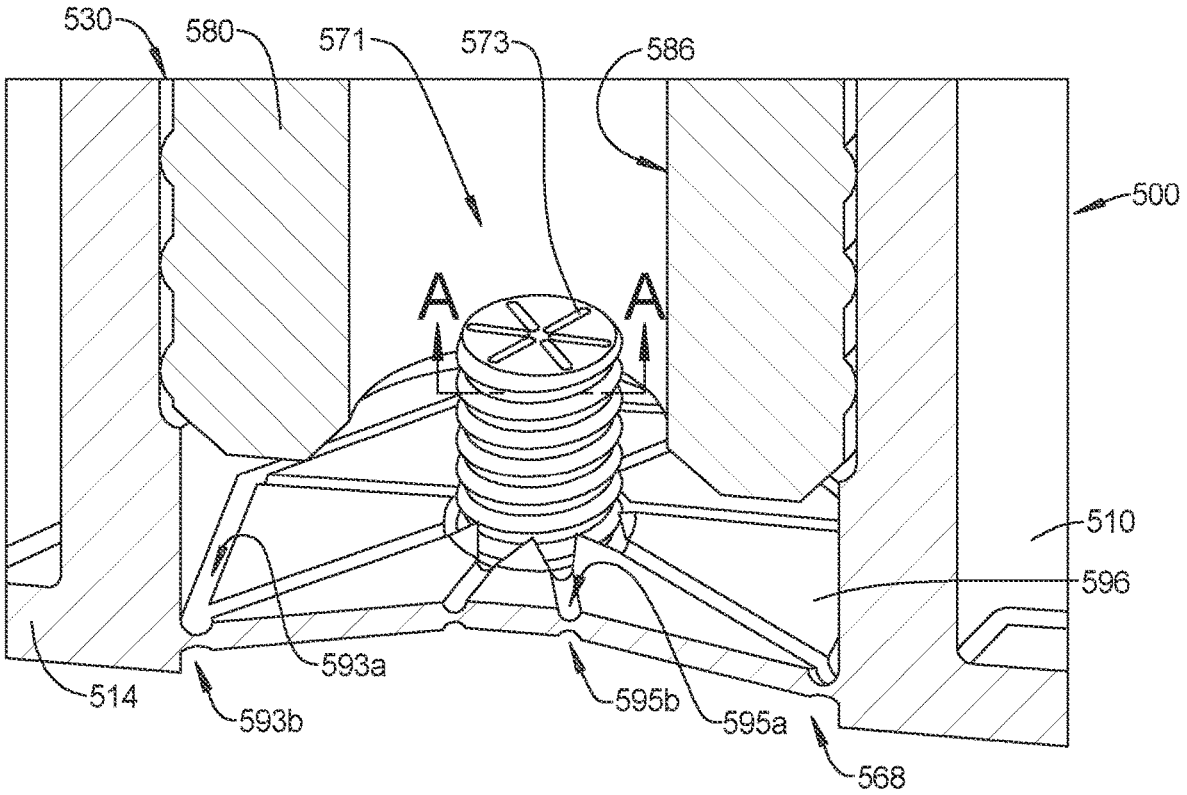
FIG. 18
Amended

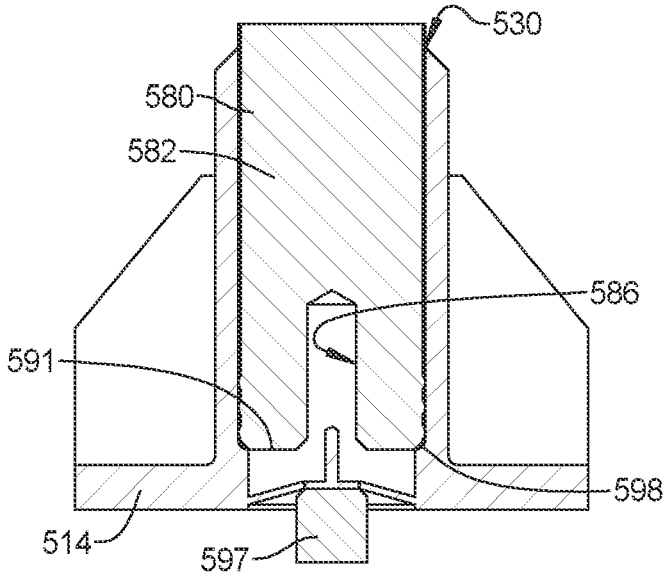
FIG. 19
Amended
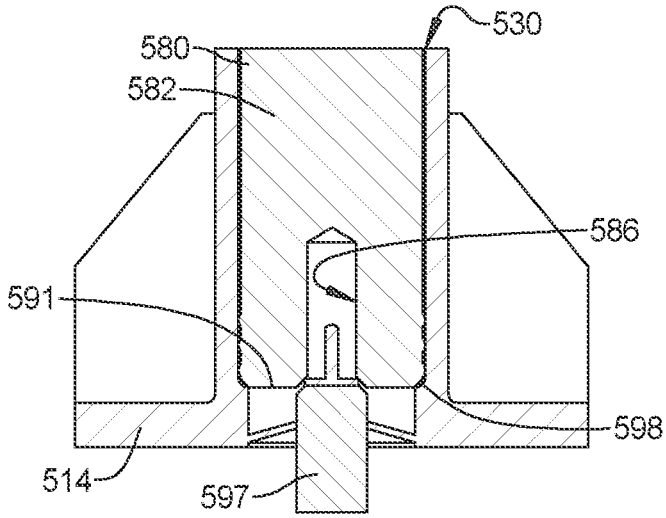
FIG. 20
Amended
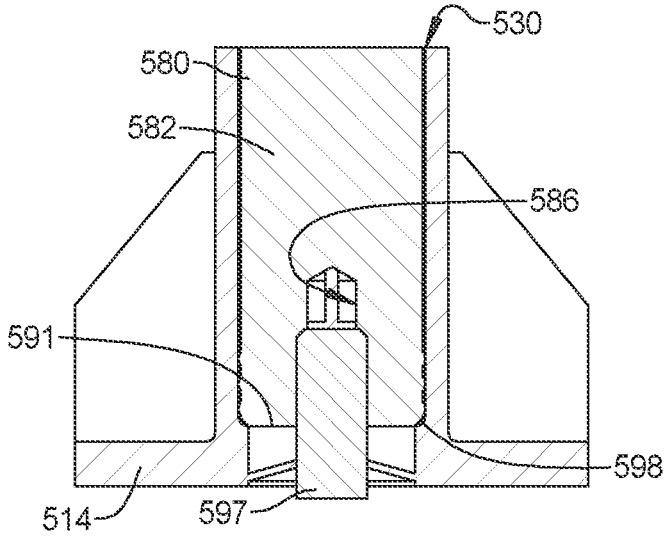
FIG. 21
Amended

BASE MEMBER FOR AN ANCHOR ASSEMBLY AND METHOD OF USE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application claims priority under 35 U.S.C. § 119(a) to European Patent Application Number 16156770.6 filed Feb. 22, 2016. The entirety of this application is incorporated herein by reference.

BACKGROUND OF THE INVENTION

The present invention relates to anchors for use in concrete substrates.

DESCRIPTION OF THE RELATED ART

Concrete structures are typically formed from concrete substrates, being either the type made off site (commonly known as pre-cast concrete substrates) or the type made on site (commonly known as cast in place (CIP) concrete substrates). Both types of concrete substrates may be reinforced with metal of other suitable materials depending on their intended application. It is often necessary to attach fixtures and fittings to concrete substrates, the nature of which might vary according to the type of structure. For instance, many buildings have floors or walls made from concrete panels from which ducts or other items may be suspended, bridges may include concrete portions from which signage and other items must be hung, and so on. This often requires an anchor to be secured to the concrete substrate such that the fixtures and fittings can be mechanically fastened to the anchor. The anchors of interest here are those which are installed during production of the substrate, rather than those retrofitted to the concrete substrate after production. The general process for installing these anchors includes the steps of setting out a form board, mounting the anchor in the desired position on the form board, securing the anchor to the form board, pouring concrete over the form board and the anchor, removing the form board from the set concrete so as to reveal the anchor in the underside of the concrete substrate. These anchors comprise an anchor point accessible from the underside of the concrete substrate and which typically take the form of a threaded bore into which a bolt or threaded shaft can be fastened.

The anchors currently available for this purpose have shortcomings which usually arise through careless installation. Installers may occasionally omit to check that the form board is free of debris and surface imperfections when locating the anchor in position. The presence of debris and surface imperfections may result in the anchor not sitting squarely on the form board. This invariably leads to (i) the anchor point being disorientated, and (ii) concrete flowing into the anchor point, thus affecting the integrity of the resulting anchor.

It is therefore an object of the present invention to provide an anchor which is easier to install and whose integrity is not affected by careless installation.

SUMMARY OF THE INVENTION

According to a first aspect of the present invention there is provided a base member for cooperating with a support member and at least one fixing member to form an anchor assembly mountable to a form board on which wet concrete may be poured during formation of a concrete substrate, the base member comprising: a mounting portion for positioning the anchor assembly on the form board prior to inserting the fixing members into the form board; an aperture having first and second generally opposed ends, the first end being open to facilitate insertion of the support member into the aperture; and a barrier reconfigurable in use from a first configuration, in which the barrier restricts ingress of wet concrete into contact with the support member via the second end of the aperture, to a second configuration in which the barrier allows an object to extend via the second end of the aperture into contact with the support member.

The barrier may comprise a plurality of segments that cooperate to restrict passage of wet concrete in the first configuration and wherein adjacent segments may be arranged to become separated from connection with each other during reconfiguration to the second configuration in use. These segments may be configured to hinge relative to the mounting portion during reconfiguration of the barrier between the first and second configurations in use. Furthermore, the barrier may have a central member that is configured to detach from engagement with the segments during reconfiguration of the barrier between the first and second configurations in use.

The barrier may be delineated by a line of weakness.

The base member may include at least one slot delineating the barrier.

The barrier may comprise a frangible part of the base member.

The barrier may be formed as an integral part of the base member or the mounting portion may include a removable insert and the barrier may be provided on the removable insert. Such a removable insert may include at least one protuberance and the mounting portion may include at least one opening in which the protuberance locates to indicate correct placement of the base member.

The aperture may include at least one channel to allow the evacuation of air during insertion of the support member.

The interior of the aperture may narrow at or towards the second end to define a shoulder against which the support member may bear.

The base member may further comprise at least one reinforcement web arranged between the mounting portion a main guide defining at least part of the aperture.

The aperture may include at least one rib adapted for engagement with the support member.

The mounting portion may an underside provided with a shallow recess which is arranged to diminish as the base member is fastened to the form board.

According to another aspect of the present invention there is provided a cast in place anchor assembly comprising: a base member as heretofore described; and a support member located in the aperture of the base member and provided with attachment means accessible through the second end of the aperture upon reconfiguration of the barrier from the first to the second configuration.

According to a further aspect of the present invention there is provided a method of creating a concrete substrate, the method comprising the steps of: providing a form board having an upper surface; providing on the form board an anchor assembly comprising: a base member having a mounting portion, the base member also having an aperture and a barrier arranged in a first configuration for restricting ingress of wet concrete along the length of the aperture after concrete pouring; and a support member located in the aperture; pouring concrete over the form board and the anchor assembly; removing the form board after concrete setting; and reconfiguring the barrier to a second configuration in which the barrier allows an object to extend via the aperture into contact with the support member.

The step of reconfiguring the barrier into the second configuration may involve inserting an object through the barrier into contact with the support member, wherein such object may be a threaded bolt, rod or otherwise for attachment to an internal thread the support member.

The step of reconfiguring the barrier into the second configuration may involve removing the barrier from within the aperture.

The step of reconfiguring the barrier into the second configuration may involve separating the barrier from the base member.

According to an aspect of the present disclosure, there is provided a base member connectable to a support member to form an anchor assembly mountable to a form board on which wet concrete may be poured during formation of a concrete substrate, the base member comprising: a mounting portion for mounting the anchor assembly to the form board; a main guide having first and second generally opposed ends, the first end being open to facilitate insertion of the support member into the main guide; and removable closing means configured at least partially to restrict access into the main guide via the second end, the closing means being removable to allow access into the main guide via the second end.

In one arrangement, the closing means is integral to the mounting portion and or the main guide, and configured to be detached during use to reveal an opening into the second end of the main guide. The closing means may be delineated by a line of weakness which may comprise perforated and or thinned material around the periphery of the closing means. In a preferred arrangement, the closing means is delineated by a plurality of slots formed around the periphery of the closing means. In this arrangement, the closing means may be attached to the mounting portion and or the main guide by small strands of material remaining between the ends of any two adjacent slots.

Furthermore, the closing means itself may comprise lines of weakness to facilitate segmenting upon detachment from the mounting portion. For example, the closing means may be defined by an annular groove such that the closing means is attached to the mounting portion by an annular band of thin material. The closing means itself may be provided with one of more grooves further defining one or more bands of thin material which can be easily broken to facilitate fragmentation and thus detachment of the closing means from the mounting portion.

Alternatively or additionally, the closing means may be defined by an area of relatively thin material on the mounting portion and which may break up when subjected to sufficient force to achieve the required detachment.

In another arrangement, the closing means may comprise a separate plug which may be removably attached to the mounting portion and secured in place. For example, the plug may screw on and off the mounting portion.

In one arrangement, the mounting portion includes a removable insert which may be fitted to the underside of the mounting portion. The closing means may be provided on that insert.

Furthermore, the removable insert may include at least one protuberance and the mounting portion may include at least one opening through which the protuberance may extend when the insert is properly fitted to the mounting portion. In this way, the protuberance may serve as an indicator to signal when one or both of the inert and the mounting portion are not sitting squarely on the form board. If the lower face of the insert or the mounting portion is not sitting squarely on the form board, the at least one protuberance may not project fully through its respective opening or may project too far through its respective opening. This is a typical consequence of debris or surface imperfections present on the form board. A squarely seated insert and mounting portion may cause the upper face of each protuberance to be flush with the upper face of the mounting portion.

Advantageously the colour of the protuberance, and perhaps the entire insert, may be different from the colour of the mounting portion. Preferably contrasting colours may be selected for the at least one protuberance and the mounting portion.

The main guide may comprise a generally tubular body upstanding from the mounting portion. The tubular body may have an internal cross-section sized and shaped to correspond closely with the cross-section of the support member so as to create a snug fit between the main guide and the support member.

Preferably the main guide may include at least one channel to allow the evacuation of air during insertion of the support member. To that end, the at least one channel may define a passage between the exterior and interior of the main guide or between the first and second ends of the main guide. The cross-section of the passage may be very small so as to allow the flow of air therethrough, but not concrete.

The main guide may also include at least one rib arranged axially and projecting inwardly. The at least one rib may add increased friction between the main guide and the support member to resist inadvertent disassembly of those parts. The main guide may be provided with a plurality of ribs circumferentially spaced around the main guide and each disposed between two neighbouring channels.

The interior of the main guide may narrow at or towards the second end to define a shoulder against which the support member may bear. The inter-engagement of the support member and the shoulder may further restrict the ingress of cement and debris into the main guide.

Advantageously the base member includes at least one reinforcement member to improve the rigidity and or strength of the main guide. The reinforcement member may comprise at least one web arranged between the main guide and the mounting portion and preferably spaced equidistantly around the main guide.

According to another aspect of the present disclosure, there is provided a cast in place anchor assembly comprising a base member as described above and a support member located in the main guide of the base member. The support member may include attachment means accessible through the second end of the main guide upon removal of the closing means. For instance, the support member may comprise a shank having opposed first and second ends. The attachment means may include a threaded bore formed in the second end of the shank and into which fasteners may be screwed following preparation of the concrete substrate. The first end of the support member may include a head configured to engage the top of the main guide once the support member is fully inserted into the main guide.

In a further aspect of the present disclosure, there is provided a method of creating a concrete substrate, the method comprises the steps of: providing a form board having an upper surface; resting on the form board an anchor assembly comprising: a base member having a mounting portion, guide means and closing means; and a support member located in the guide means; pouring concrete over the form board and the anchor assembly; and removing the form board, and further including the step of removing the closing means of the cast in place anchor assembly so as to provide access to the support means.

BRIEF DESCRIPTION OF THE DRAWINGS

By way of example only embodiments of the present invention will now be described in detail, with reference being made to the accompanying drawings, in which:

FIG. 14 is a perspective view of the base member of an anchor assembly according to a fifth embodiment of the invention;

FIGS. 15, 16 and 17 illustrate insertion of a threaded bolt into an anchor assembly according to the fifth embodiment;

FIG. 18 is a cross-sectional view through an anchor assembly according to a sixth embodiment of the invention; and FIGS. 19, 20 and 21 illustrate insertion of a threaded bolt into an anchor assembly according to the sixth embodiment.

DETAILED DESCRIPTION OF THE INVENTION

Figure 1:
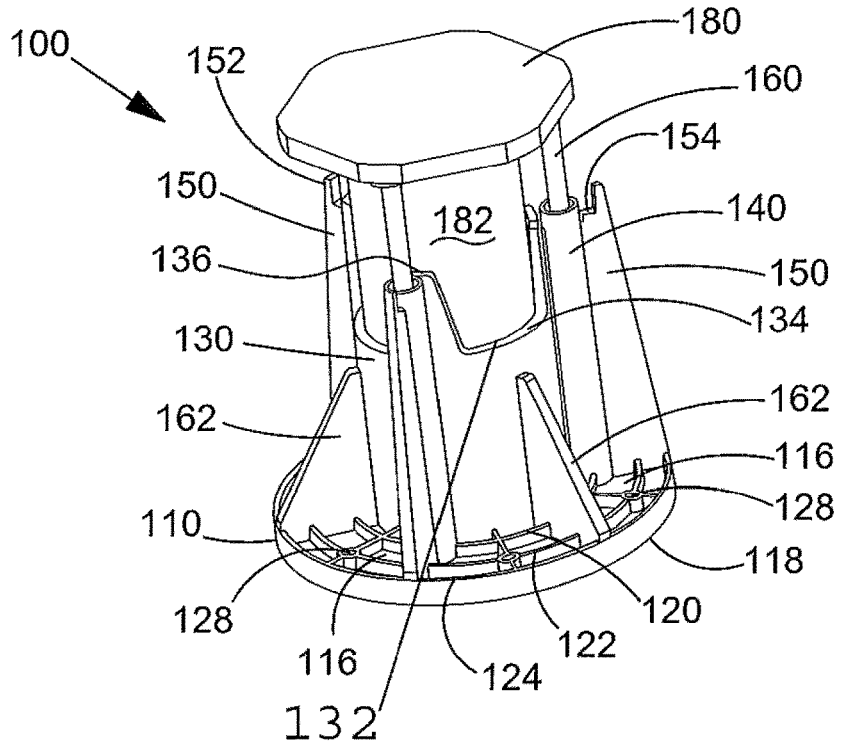
FIG. 1 is a first perspective view of an anchor assembly according to a first embodiment of the invention.

FIGS. 1 to 4 show a first embodiment of the anchor assembly, which is generally indicated 100. The anchor assembly 100 includes a base member 110 which may be mounted to a form board 112 (FIG. 5) and a support member 180 for location in the base member 110.

Figure 3:
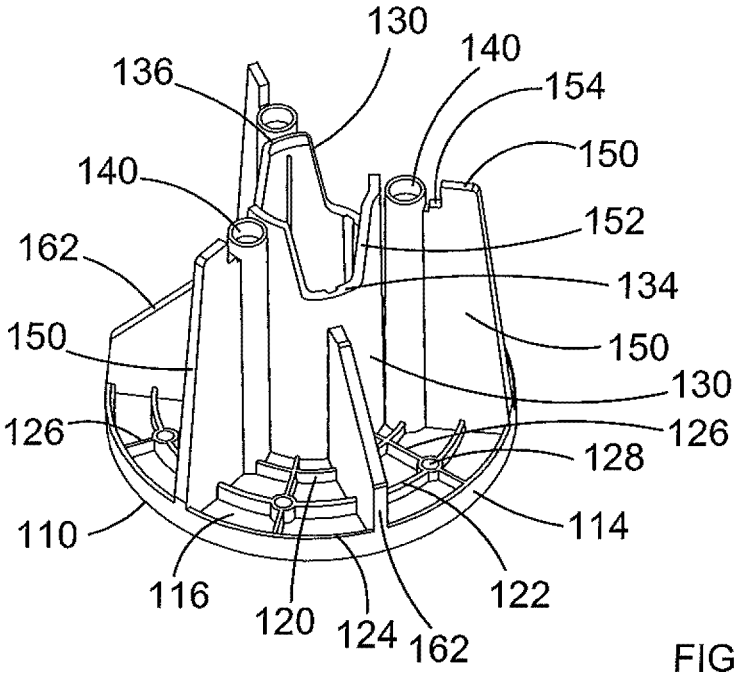
FIG. 3 is a perspective view of the base member of the anchor assembly of FIGS. 1 and 2.
Figure 4:
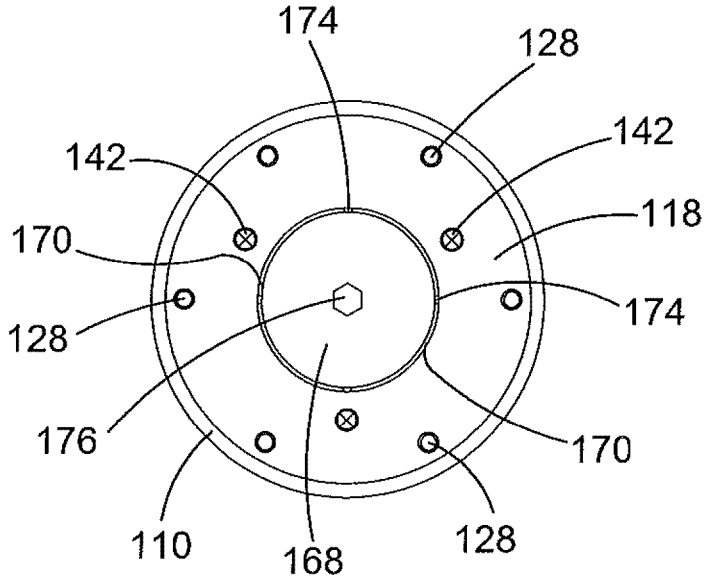
FIG. 4 is a bottom view of the base member shown in FIG. 3.

Referring specifically to FIGS. 3 and 4, the base member 110 comprises a mounting portion 114 in the form of a generally circular disc defining opposed upper and lower faces 116, 118. The lower face 118 is generally planar so as to sit squarely on the generally planar upper surface of a form board 112 used in creating the concrete substrate.

The upper face 116 is provided with three annular ridges extending concentrically around a central region of the base member 110 and each lying on a different radius to define inner, middle and outer annular ridges 120, 122, 124. The upper face 116 is also provided with six radial ridges 126 extending from the periphery of the central region towards the periphery of the base member 110. The radial ridges 126 are substantially equi-spaced and intersect the three annular ridges 120, 122, 124. These intersecting radial and annular ridges increase the rigidity of the base member 110. The base member 110 is provided with six auxiliary through holes 128 located at the intersection between the intermediate annular ridge 122 and each radial ridge 126. These auxiliary through holes 128 may optionally be used to secure the base member 110 to the form board 112 using nails, screws or like fasteners (not shown).

A guide member 130 extends upwardly from the upper face 116 of the mounting portion 114. The guide member 130 is generally tubular with a circular cross-section and is located in the central region of the base member 110 so as to be inside the inner annular ridge 120. The guide member 130 has an upper circumferential rim 132 which is castellated to define three equi-spaced troughs 134 and three equi-spaced peaks 136, the troughs being wider than the peaks. The base member 110 also includes three nail guides 140 equi-spaced around the guide member 130. Each nail guide 140 is attached to the guide member 130 and extends upwardly from the upper surface 116 and terminates at a respective peak 136 of the castellated upper circumferential rim 132. Each nail guide 140 comprises a tubular body defining a circular passage which continues through openings 142 in the mounting portion 114.

The base member 110 is strengthened by three large webs 150 arranged between a respective nail guide 140 and the upper surface 116. The top 152 of each large web 150 extends slightly above its respective nail guide 140 and includes a notch 154 for accommodating the head 158 of a fixing member such as nail 160 received in the nail guide 140. Interposed between each pair of large webs 150 is a small web 162 arranged between the guide member 130 and the upper face 116 of the mounting portion 114. The top of each small web 162 locates slightly below a respective trough 134 of the castellated circumferential rim 132.

Figure 2:
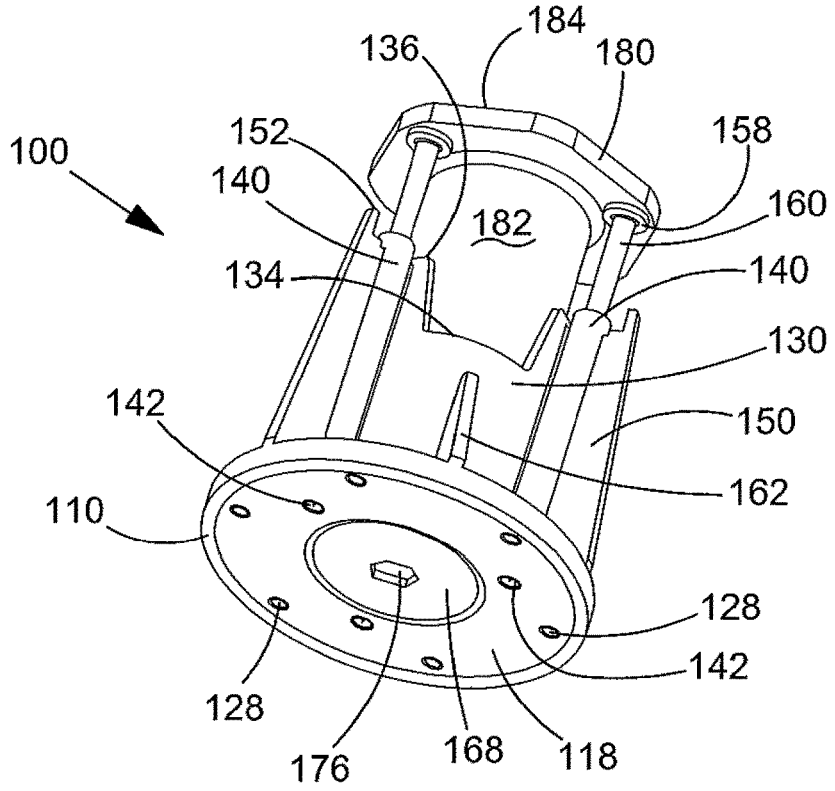
FIG. 2 is a second perspective view of the anchor assembly shown in FIG. 1.

Referring now to FIGS. 2 and 4, the central region of the mounting portion 114 of the base member 110 is provided with a closure member 168. In this embodiment, the closure member 168 is delineated by four arcuate slots 170 arranged end to end on a circle having a location and radius corresponding to those of the interior of the guide member 130. The closure member 168 remains attached to the mounting portion 114 by four threads 174 defined by the areas of the mounting portion 114 remaining between the ends of any two adjacent arcuate slots 170. The centre of the closure member 168 is provided with connection means 176, such as a hexagonal recess, to facilitate rotation of the closure member 168 by an appropriate tool. The threads 174 are sufficiently few and small to break upon rotation of the closure member 168 to facilitate its detachment from the mounting portion 114. The slots 170 are sufficiently narrow to restrict the ingress of concrete and other debris inside the main guide 130.

Referring now to FIGS. 1 and 2, there is shown the support member 180 located inside the base member 110. The support member 180 includes a cylindrical shank 182 having a head 184 at a first end and a blind bore 186 at a second end. The shank has a length and a diameter corresponding closely to the length and internal diameter of the guide member 130; the correspondingly sized diameters enable a snug fit to be achieved between the guide member 130 and the support member 180 so as to restrict the ingress of concrete therebetween. In use, after the arrangement illustrated in FIGS. 1 and 2 is placed on a wooden form board, the head 184 of the support member 180 is urged towards the base member 110 by impacting it with a hammer. This causes the shaft 182 to move telescopically along the opening defined by the guide member 130, thereby urging the nails 160 outward through the openings 142 in the mounting portion 114 and into the form board. Such telescopic movement of the support member 180 and base member 110 relative to each other is restricted when the nail heads 158 engage the upper edges of the nail guides 140 and/or when the end of the support member cylindrical shaft 182, distal from the head 184 thereof, engages the inner side of the closure member 168 (the other side of the closure member 168 being in contact with the wooden form board).

In general terms the guide member 130 and mounting portion 114 cooperate to define an aperture through the base member 110, which the closure member 168 or barrier restricts access along the length thereof prior to being removed. During use of the anchor assembly 100 the closure member 168 restricts ingress of wet concrete along the length of the aperture through the base member 110 into contact with the threaded bore 186 of the support member 180, wherein after concrete setting and form board removal the closure member 168 can be removed from within the aperture through the base member 110 using an appropriate tool which cooperates with the connection means 176 to expose the threaded bore 186 of the support member 180.

The heretofore described frangible connection of the closure member 168 need not necessarily comprise a plurality of threads 174. For example in other embodiments the closure member 168 may be integrally connected to an inner wall of the aperture extending through the base member 110 by an annular section of material that is sufficiently thin so as to break upon manipulating the closure member 168 (e.g. twisting or pulling) using an appropriate tool which cooperates with the connection means 176.

In a second embodiment of the anchor assembly 100 the base member 110 is adapted such that the closure member 168 is arranged at a location along the length of the generally tubular guide member 130 such that it is caused to break off upon insertion of a support member 180 in use. In other words, when the cylindrical shaft 182 of a support member 180 is urged along the length of the guide member 130 it engages the closure member 168 before it is fully inserted. Further insertion of the cylindrical shaft 182 into the guide member 130 breaks the frangible connection between the closure member 168 and the guide member 130 such that it is forced along the length of the guide member 130 with the distal end of the cylindrical shaft 182.

Figure 5:
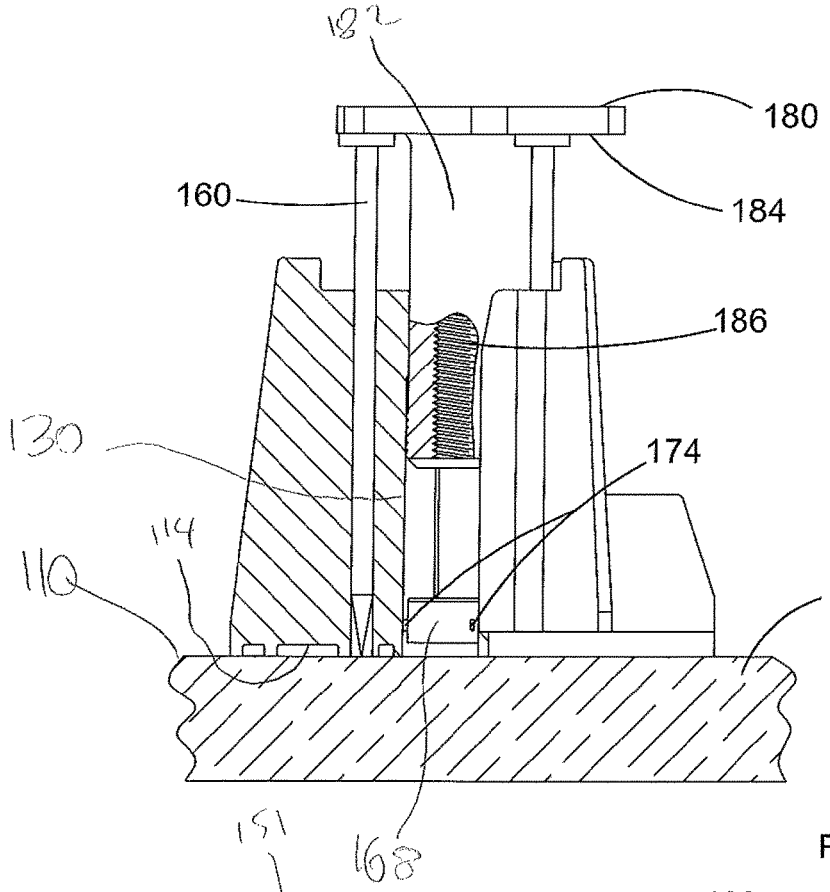
FIG. 5 is a cross-sectional view of an anchor assembly according to a second embodiment mounted to a form board.
Figure 6:
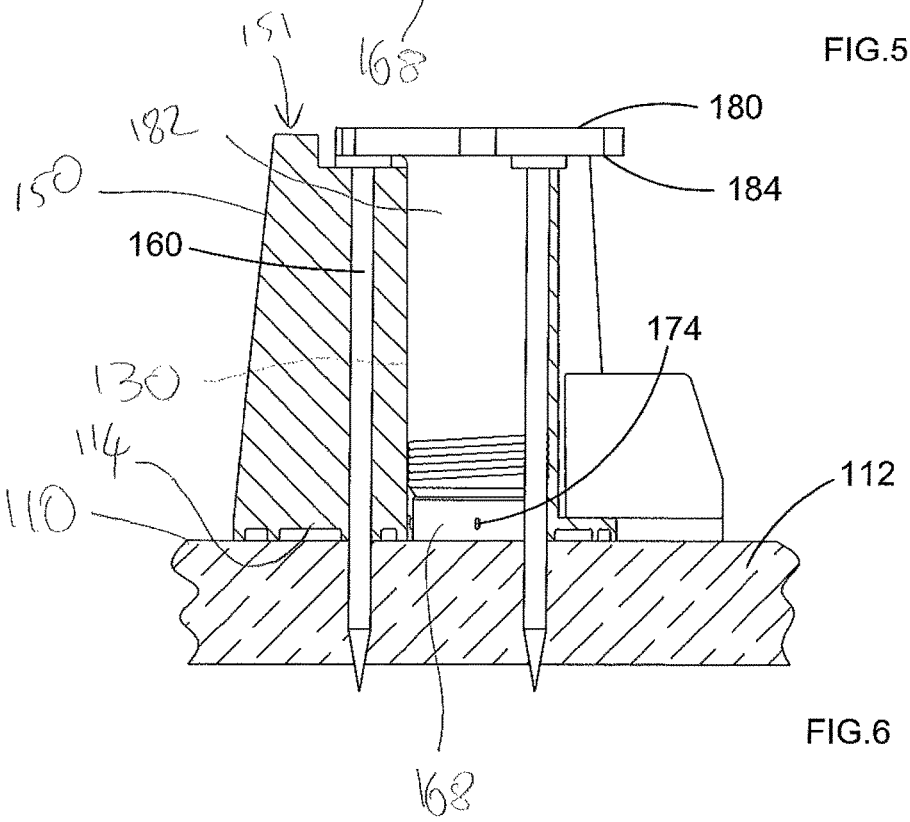
FIG. 6 is a cross-sectional view of the anchor assembly and form board of FIG. 5 secured together.
Figure 7:
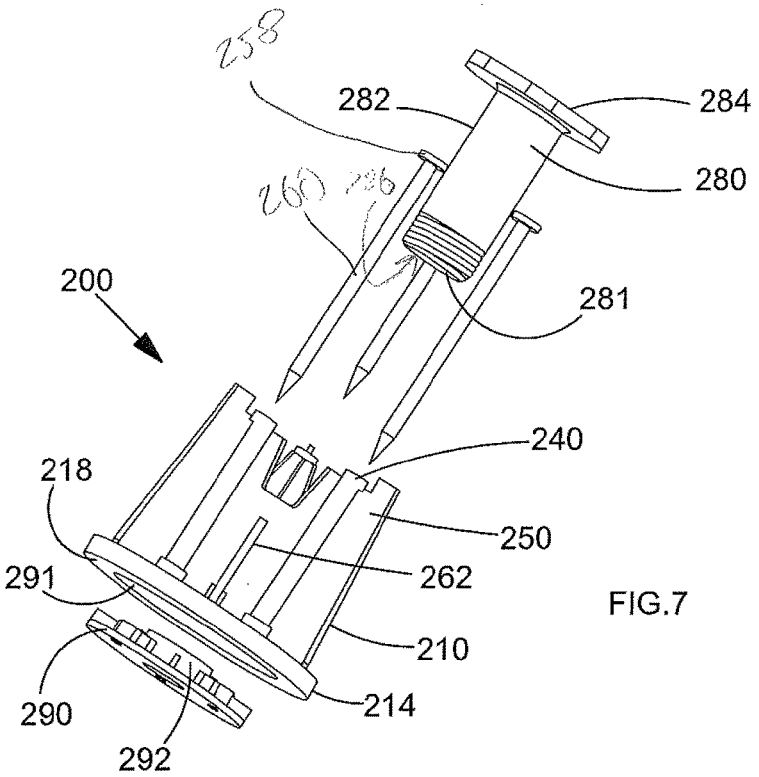
FIG. 7 is an exploded view of an anchor assembly according to a third embodiment of the invention.
Figure 8:
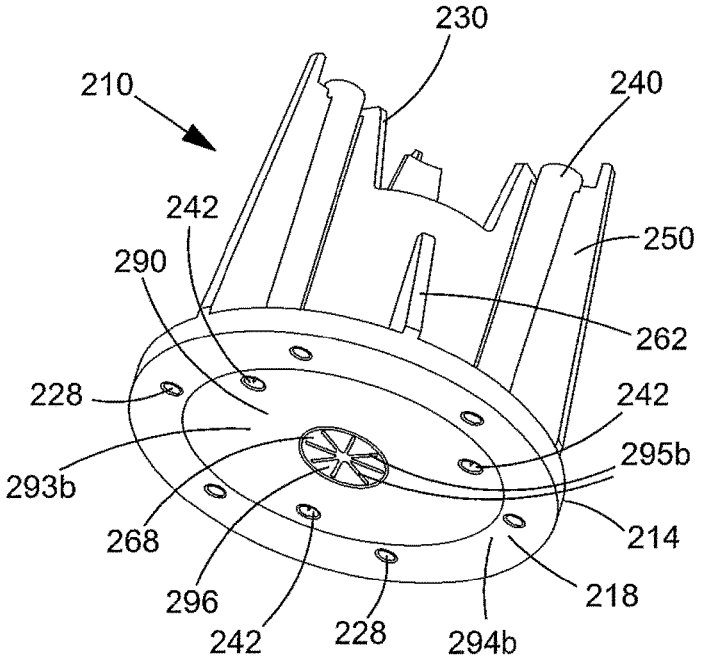
FIG. 8 is a perspective view of the base member of the anchor assembly shown in FIG. 7.
Figure 9:
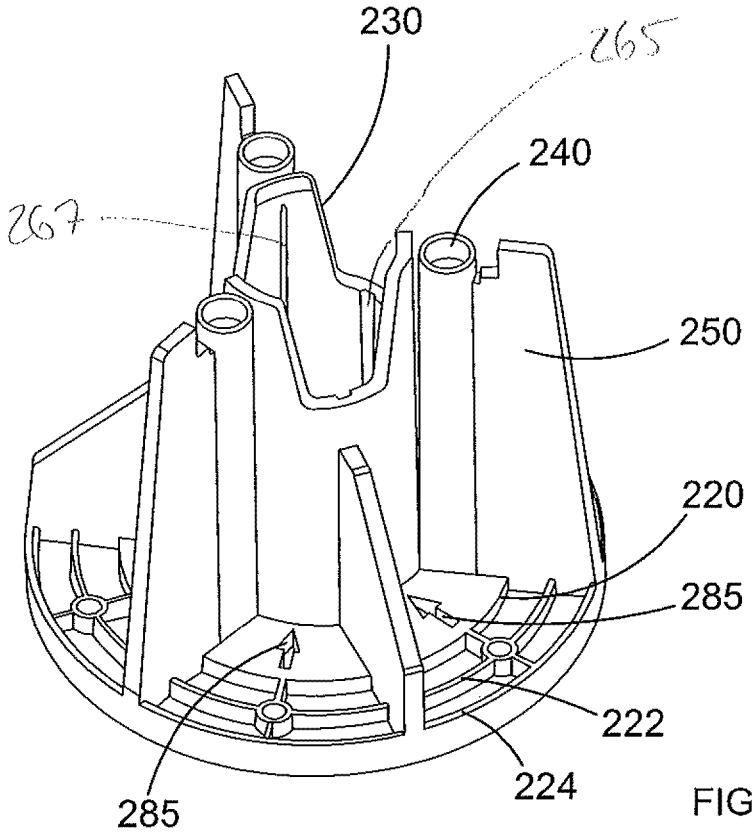
FIG. 9 is a second perspective view of the base member of FIGS. 7 and 8.
Figure 10:
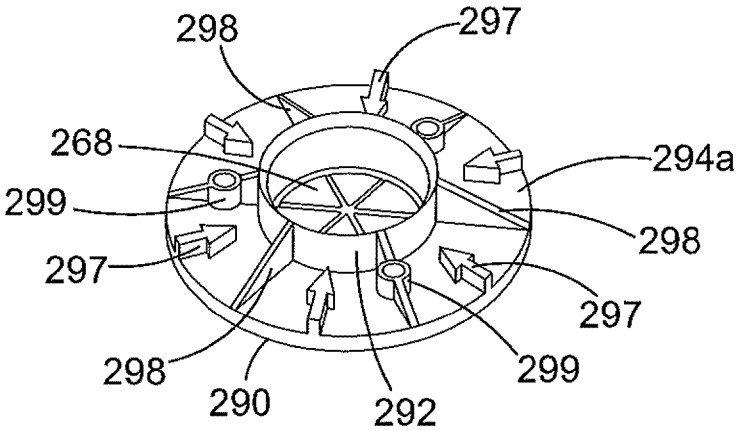
FIG. 10 is an insert for the base member of FIGS. 7 to 9.
Figure 11:
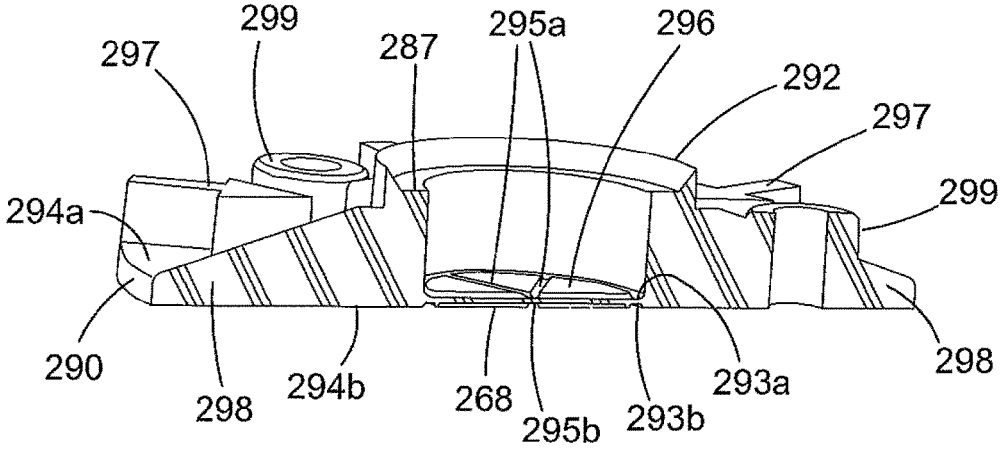
FIG. 11 is a sectional view through the insert of FIG. 10.

This is illustrated in FIG. 5 which depicts an anchor assembly according the second embodiment arranged on a form board 112 prior to driving the support member 180 downwards to force the nails 160 thereinto. The closure member 168 is illustrated as being provided along the length of the guide member 130. Upon driving the support member 180 downwards, thereby forcing the nails 160 into the form board 112 as illustrated in FIG. 6, the cylindrical shaft 182 breaks the connection provided by the threads 174 such that the closure member 168 is forced into engagement with the form board 112. Telescopic movement of the support member 180 and base member 110 relative to each other is restricted when the cylindrical shaft 182 is inserted sufficiently far through the guide member 130 that the closure member 168 is pressed against the form board 112.

In the configuration illustrated in FIG. 6 the closure member 168 is located within an opening defined by the mounting portion 114. Again in general terms the guide member 130 and mounting portion 114 cooperate to define an aperture through the base member 110. In use (as illustrated in FIG. 6) the closure member 168 or barrier restricts access by wet concrete along the length of the aperture through the base member 110 into contact with the threaded bore 186 of the support member 180. After concrete setting and form board removal however the closure member 168 can be urged from within the aperture through the base member 110 under gravity and/or by gentle tapping to expose the threaded bore 186 of the support member 180.

From the foregoing it will be appreciated that the closure member 168 of the second anchor assembly embodiment described herein does not necessarily require connection means 176 for cooperation with an appropriate tool. Furthermore, the frangible connection between the closure member 168 and the guide member 130 need not necessarily comprise a plurality of threads 174 as heretofore described. For example in other embodiments the closure member 168 may be integrally connected to the guide member 130 by an annular section of material member that is sufficiently thin so as to break upon insertion of a support member 180 through the guide member 130 as previously described.

FIGS. 7 to 11 show a third embodiment of the anchor assembly. Many features of this embodiment are also common to the first and second embodiments; as such, corresponding features in those embodiments will be described and illustrated with corresponding reference numerals and limited discussion of those will be given here in connection with this third embodiment.

The third embodiment of the anchor assembly 200 includes a base member 210 and a support member 280. The base member 210 includes a mounting portion 214 being substantially circular and having opposed upper and lower faces 216, 218. The upper face 216 is provided with radial and annular ridges 220, 222, 224, 226, guide means 230, nail support means 240 and also large and small webs 250, 262.

The base member 210 includes an insert 290 which locates in a shallow recess 291 in the lower face 218 of the mounting portion 214. The insert 290 and the recess 291 are of a similar size and shape so as to form a snug fit. The insert 290 is generally circular and includes an annular wall 292 arranged concentrically on its upper face. The portion of the insert 290 inside the annular wall 292 comprises a closure member 268 which is delineated by lines of weakness. In particular, the insert 290 includes opposed annular grooves 293a, 293b arranged on opposed first and second sides 294a, 294b of the insert 290. Each side 294a, 294b of the insert 290 includes six radial grooves 295a, 295b extending outwardly from the centre of the insert 290, the grooves 293a, 295a on the first side 294a of the insert 290 being aligned with corresponding grooves 293b, 295b on the second side 294b of the insert 290. The annular and radial grooves 293a, 293b, 295a, 295b on the first and second sides 294a, 294b of the insert 290 therefore define six segments 296 making up the closure member 268. The portion of the insert 290 located between a pair of opposed grooves on the first and second sides 294, 294b is relatively thin so as to form a frangible joint which may be broken with sufficient force.

The first side 294a of the insert 290 is provided with six protuberances 297 spaced equidistantly around the annular wall 292, those protuberances in this example comprising arrows directed to the centre of the insert 290. Between each pair of adjacent protuberances 297 there is provided a web 298 upstanding from the first side 294a and joining the annular wall 292. Three of the webs 298 are provided with bosses 299 which align with the nail guides 240 on the guide member 230 and include through holes to allow the passage of nails 260 through the insert 290.

The shallow recess 291 is shaped to receive the various features of the insert 290. In particular, the shallow recess 291 includes six apertures 285 and six slots (not shown) arranged alternately so as to receive the respective alternating protuberances 297 and webs 298 of the insert 290. The slots are blind such that the webs 298 do not extend through the mounting portion 214, but the apertures 285 are open so as to allow the protuberances 297 to extend beyond the mounting portion 214. The protuberances 297 indicate when the insert 290 and mounting portion 214 are located squarely on the form board (not shown) by extending into the apertures 285. In some embodiments the protuberances 297 are similarly configured to indicate when the insert 290 and mounting portion 214 are located squarely on the form board (not shown) by extending fully into the apertures 285 but not beyond.

The guide member 230 is provided with three axial channels 265 and three axial ribs 267 which are arranged in an alternating fashion on the internal face of the guide member. Each channel 265 is aligned with a respective trough and each rib 267 is aligned with a respective peak. The channels 265 are tapered such that their cross-sectional area increases towards the upper circumferential rim. The ribs 267 are configured to deform slightly as the support member is inserted into the guide member so as to provide an interference to resist inadvertent disassembly.

The annular wall 292 locates partway into the guide member 230 and the top face of the annular wall defines a shoulder 287 against which the second end 281 of the support member 280, distal from the head 284 thereof, may bear in some embodiments.

In use, after the anchor assembly 200 has been placed on a wooden form board, the head 284 of the support member 280 is urged towards the base member 210 by impacting it with a hammer. This causes the shaft 282 to move telescopically along the opening defined by the guide member 230, thereby urging the nails 260 outward through the openings 242 in the mounting portion 214 and into a form board. Such telescopic movement of the support member 280 and base member 210 relative to each other is restricted when the nail heads 258 engage the upper edges of the nail guides 240 and/or when the second end 281 of the support member 280, distal from the head 284 thereof, engages the shoulder defined by the annular wall 292.

In general terms the guide member 230 and the insert 290 in contact with the mounting portion 214 cooperate to define an aperture through the base member 210, which the closure member 268 or barrier restricts access along the length thereof prior to being removed. During use of the anchor assembly 200 the closure member 268 restricts ingress of wet concrete along the length of the aperture through the base member 210 into contact with the threaded bore 286 of the support member 280, wherein once the concrete has set over the anchor assembly 200 and the form board is removed, the closure member 268 may be gently struck so as to cause the six segments 296 to break away from the insert 290. The threaded bore (not shown, but comparable to threaded bore 186 of the first embodiment) of the support member 280 may then be accessed through the annular wall 292.

Figure 12:
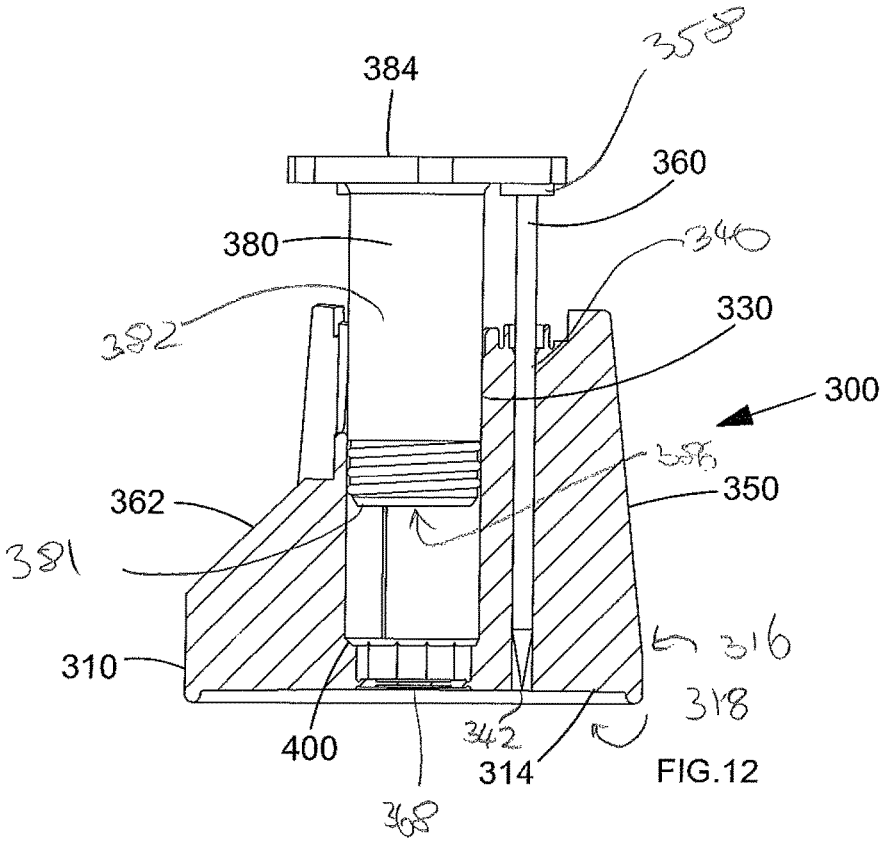
FIG. 12 is a sectional side view of an anchor assembly according to a fourth embodiment of the invention.
Figure 13:
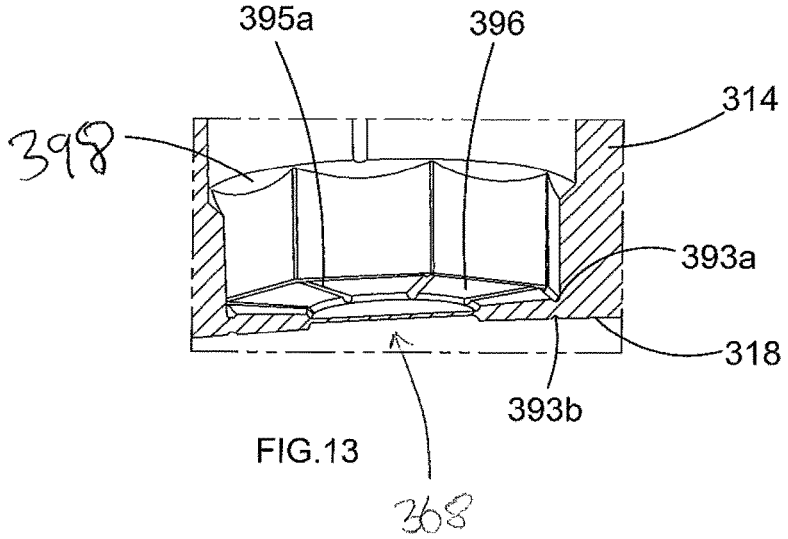
FIG. 13 is a sectional view through part of the base member of FIG. 12.

A fourth anchor assembly embodiment will now be described with reference to FIGS. 12 and 13. Again, there are many features of this embodiment which are also common to the preceding embodiments. Therefore, common features are described and illustrated with corresponding reference numerals. For instance the fourth embodiment of the anchor assembly 300 includes a base member 310 and a support member 380 and, like the preceding embodiments, the base member 310 includes a mounting portion 314 being substantially circular and having opposed upper and lower surfaces 316, 318, the upper surface 316 being provided with a guide member 330, nail support members 340 and also large and small webs 350, 362.

In this embodiment however, the base member 310 includes a shallow recess in its lower face which is concaved with a very large radius of curvature compared to the radius of the base member. The shallow recess serves to increase the sealing between the base member and a form board in use so as to protect the closure member 368 from wet concrete being poured onto the form board. In particular, as the base member 310 is nailed to a form board in use, the recess diminishes and the outer periphery of the base member 310 becomes under increased tension against the form board.

The closure member 368 is arranged in the centre of the lower face 318 of the mounting portion 314 so as to be directly below the internal bore of the guide member 330. The closure member 368 in this embodiment is polygonal so as to include a plurality of edges 400 forming its periphery. The closure member 368 is defined by a very thin portion of the mounting portion 314 and delineated by opposed peripheral grooves 393a, 393b on the upper and lower faces 316, 318. Opposed radial grooves 395a, 395b are provided on the upper and lower faces 316, 318 so as to divide the closure member 368 into a plurality of segments 396 corresponding to the plurality of sides of the chosen polygon. The material remaining between any pair of opposed grooves 393a, 393b, 395a, 395b on the upper and lower faces 316, 318 is very thin so as to form a frangible joint.

The interior of the guide member 330 immediately above the closure member 368 has a polygonal cross-sectional shape corresponding to the polygonal shape of the closure member 368. The internal shape of the guide member 330 transitions from polygonal to circular a short distance above the closure member 368. The transition defines a shoulder 398 against which the support member 380 may bear once located in the guide member 330 in some embodiments.

In use, after the anchor assembly 300 has been placed on a wooden form board, the head 384 of the support member 380 is urged towards the base member 310 by impacting it with a hammer. This causes the shaft 382 to move telescopically along the opening defined by the guide member 330, thereby urging the nails 360 outward through the openings 342 in the mounting portion 314 and into the form board. Such telescopic movement of the support member 380 and base member 310 relative to each other is restricted when the nail heads 358 engage the upper edges of the nail guides 340 and/or when the second end 381 of the support member 380, distal from the head 384 thereof, engages the above mentioned shoulder 398.

In general terms the guide member 330 and mounting portion 314 cooperate to define an aperture through the base member 310, which the closure member 368 or barrier restricts access along the length thereof prior to being removed. During use of the anchor assembly 300 the closure member 368 restricts ingress of wet concrete along the length of the aperture through the base member 310 into contact with the threaded bore 386 of the support member 380, wherein once the concrete has set over the anchor assembly 300 and the form board is removed, the closure member 368 may be gently struck so as to cause the plurality of segments 396 to break away from the mounting portion 314. The threaded bore 386 of the support member 380 may then be accessed through the opening into the guide member 330.

It is envisaged that in some embodiments the closure member does not need to be removed from the base member to enable access to a threaded bore of a support member after concrete setting and form board removal. For instance, in a fifth embodiment, the closure member is an integral part of the base member that can flex to enable such access to a threaded bore of a support member after concrete setting and form board removal. Such an embodiment will now be described with reference to FIGS. 14 to 17 in which there are many features common to the preceding embodiments that will thus not be described in detail; as such, corresponding features in those embodiments are described and illustrated with corresponding reference numerals. For instance the fifth embodiment of an anchor assembly 400 includes a base member 410 and a support member 480 and like the preceding embodiments the base member 410 includes a mounting portion 414 being substantially circular and having opposed upper and lower surfaces, the upper surface being provided with a guide member 430, nail support members 440 and also large and small webs 450, 462.

The mounting portion 414 defines an opening which cooperates with the guide member 430 to define an aperture through the base member 410. In addition, the guide member 430 narrows towards the mounting portion 414 to define a shoulder 498 which the second end 491 of a support member 480 may bear once located in the guide member 430 in some embodiments.

In use, after the anchor assembly 400 has been placed on a wooden form board, the head 484 of the support member 480 is urged towards the base member 410 by impacting it with a hammer. This causes the shaft 482 to move telescopically along the opening defined by the guide member 430, thereby urging the nails 460 outward through the openings 442 in the mounting portion 414 and into the form board. Such telescopic movement of the support member 480 and base member 410 relative to each other is restricted when the nail heads 458 engage the upper edges of the nail guides 440 and/or when the second end 481 of the support member 480, distal from the head 484 thereof, engages the above mentioned shoulder 498.

The closure member 468 includes opposed outer grooves 493a, 493b arranged on opposed first and second sides of the mounting portion 414, the opposed outer grooves defining a polygonal shape (in the specific example illustrated in FIG. 14 an octagon). Furthermore, each side of the closure member 468 includes opposed radial grooves 495a, 495b on opposite sides of the closure member 468 extending outwardly from the centre thereof. The outer and radial grooves on the opposite sides of the closure member 468 define a plurality of segments 496 (in the specific embodiment illustrated, eight segments) making up the closure member 468. The portion of the closure member between a pair of opposed radial grooves 495a, 495b is relatively thin so as to form a frangible joint which may be broken upon urging a threaded bolt against the closure member. However, the portion of the closure member between a pair of opposed outer grooves 493a, 493b is thin enough to bend, but not break, upon urging a threaded bolt against the closure member.

From the foregoing paragraph, it will be appreciated that the closure member 468 need not necessarily be octagonal in shape and could instead, for example, be decagonal (10 sides) in shape, whereby in such an embodiment the closure member 468 would include ten radially extending groove portions defining ten segments 496.

Upon inspecting FIGS. 15 to 17 it will become apparent how the closure member 468 can restrict the ingress of wet concrete into engagement with the internal threaded bore 486 of a support member 480 in use, while enabling access thereto by a threaded bolt 497 after concrete setting and form board removal.

Yet again in general terms the guide member 430 and mounting portion 414 cooperate to define an aperture through the base member 410. In use (see FIG. 15) the closure member 468 or barrier restricts access by wet concrete along the aperture through the base member 410 into contact with the threaded bore 486 of a support member 480. After concrete setting and form board removal the closure member 468 can flex open to permit the insertion of a threaded bolt 497 such that the threaded bolt 497 can be coupled to the internal bore 486 of the support member 480 set in concrete. Upon urging a threaded bolt 497 against the closure member 468, the respective segments 496 of the closure member 468 detach from one another and hinge relative to the mounting portion 414.

Furthermore, looking at FIG. 17, it will be appreciated that the closure member 468 should be located sufficiently far away from the threaded bore 486 of a support member 480 in use so the segments 496 do not become jammed between the support member 482 and a threaded bolt 497 upon insertion of such a threaded bolt 497 through the closure member 468 after concrete setting and form board removal.

A sixth anchor assembly embodiment will now be described with reference to FIGS. 18 to 21 in which there are many features common to the preceding embodiments that will thus not be described in detail; as such, corresponding features in those embodiments are described and illustrated with corresponding reference numerals. For instance the sixth anchor assembly embodiment includes a base member 510 and support member 580 and like the preceding embodiments the base member 510 includes a mounting portion 514 being substantially circular and having opposed upper and lower surfaces, the upper surface provided with a guide member 530, nail support members 540 and also large and small webs 550, 562.

The mounting portion 514 defines an opening which cooperates with the guide member 530 to define an aperture through the base member 510. In addition, the guide member 530 narrows towards the mounting portion 514 to define a shoulder 598 which the second end 591 of a support member 580 may bear once located in the guide member 530 in some embodiments.

In use, after the anchor assembly 500 has been placed on a wooden form board, the head 584 of the support member 580 is urged towards the base member 510 by impacting it with a hammer. This causes the shaft 582 to move telescopically along the opening defined by the guide member 530, thereby urging the nails 560 outward through the openings 542 in the mounting portion 514 and into the form board. Such telescopic movement of the support member 580 and base member 510 relative to each other is restricted when the nail heads 558 engage the upper edges of the nail guides 540 and/or when the second end 581 of the support member 580, distal from the head 584 thereof, engages the above mentioned shoulder 598.

The closure member 568 includes opposed outer grooves 593a, 593b arranged on opposed first and second sides of the mounting portion 514, the opposed outer grooves defining a polygonal shape (in the specific example illustrated in FIG. 18 an octagon). Furthermore, each side of the closure member 568 includes opposed radial grooves 595a, 595b on opposite sides of the closure member 568 extending inwards towards the centre thereof. These radially extending grooves are arranged so as to define a plurality of closure member segments 596 which become narrower in a direction extending towards the centre of the closure member 568. Additionally, the closure member 568 has a plug body 571 at the centre thereof, which has a substantially flat base and a plurality of walls 573 extending upwards therefrom towards the guide member 530. The number of walls 573 corresponds to the number of radially extending grooves 595a, 595b and so in the specific embodiment illustrated, the octagonal shaped base member 568 has eight radially extending grooves and so eight walls 573 provided on the plug body 571. From FIG. 18 it will be apparent that each of the walls 573 has a dimension extending away from the centre of the closure member 568 in alignment with a respective radially extending groove. As such, the walls 573 provide that the cross-section of the plug body 571 along the direction A-A is a geometrical shape having a plurality of intersecting lines. In the specific embodiment illustrated the cross-section of the plug body 571 along the direction A-A is substantially star shaped having eight arms extending from the centre thereof.

From the foregoing paragraph, it will be appreciated that the closure member 568 need not necessarily be octagonal in shape and could, for example, be decagonal (10 sides) in shape. In such an embodiment the closure member would include ten radially extending groove portions and the plug body 571 would thus have ten walls 573 thereon so that the cross-section of the plug member 571 along a similar direction to A-A in FIG. 18 would be substantially star shaped having ten arms extending from the centre thereof.

Continuing with reference to the specific embodiment illustrated in FIG. 18, the material of the closure member 568 between a pair of opposed radial grooves 595a, 595b is relatively thin so as to form a frangible joint which may be broken upon urging a threaded bolt against the closure member 568. Additionally, the material of the closure member 568 between the base of the plug body 571 and both the respective segments 596 and radial groove portions is relatively thin so as to form a frangible joint which may be broken upon urging a threaded bolt against the closure member 568. However, the material of the closure member between a pair of opposed outer grooves 593a, 593b is thin enough so as to bend, but not break, upon urging a threaded bolt against the closure member 568.

Upon inspecting FIGS. 19 to 21 it will become apparent how the closure member 568 can restrict the ingress of wet concrete into engagement with the internal threaded bore 586 of a support member 580 in use, while enabling access thereto by a threaded bolt 597 after concrete setting and form board removal.

In general terms the guide member 530 and mounting portion 514 cooperate to define an aperture through the base member 510. In use (see FIG. 18) the closure member 568 or barrier restricts access by wet concrete along the aperture through the base member 510 into contact with the internal threaded bore 586 of a support member 580. After concrete setting and form board removal however the closure member 568 can be cracked and flexed open to permit the insertion of a threaded bolt 597 such that the threaded bolt 597 can be coupled to the internal bore 586 of the support member 480 set in concrete.

Upon urging a threaded bolt 597 against the closure member 568, the respective segments 596 of the closure member 568 flex inwards so as to move the plug body 571 slightly inwards towards a support member 580 located in the guide member 530 (see FIG. 19). Pushing the threaded bolt 597 further against the closure member 568 causes the plug body 571 to become detached from the respective segments 596 of the closure member 568 and the respective segments 596 to become separated from each other. The plug body 571 is thus urged into the internal threaded bore 586 of the support member 580, whereas the segments 596 hinge relative to the mounting portion 514 (see FIG. 20). The threaded bolt 597 can thus be twisted into threaded engagement with the support member 580 set in concrete (see FIG. 21).

Furthermore, looking at FIG. 19 specifically, it will be appreciated that the upper end of the plug body 571 should be located sufficiently closely to the second end 591 of the support member 580 in use such that when a threaded bolt is urged against the closure member 568 the plug body 571 becomes partially located within the internal threaded bore 586 of the support member 580 before the plug body 571 becomes detached from the respective segments 596 of the closure member 568. This provides that the plug body 571 does not become jammed between the support member 582 and a threaded bolt 597 when such a bolt is inserted through the closure member 568 in use.

It is envisioned that in some embodiments at least part of the base member of an anchor assembly may be coloured to indicate something to users. For example, in the first embodiment heretofore described the entire base member 110, or just the closure member 168 may be coloured to indicate something to personnel about the support member 180 after concrete setting and form board removal. In one such instance, one colour e.g. red could be used to indicate to workers where threaded bores of one particular size are located in set concrete and another colour e.g. blue could be used to indicate to workers where threaded bores of another particular size are located. Also, one colour e.g. green could be used to indicate where workers of one particular nature (e.g. electricians) are to secure their fixings in a concrete substrate (e.g. where wire trunking is to be hung) and another colour e.g. pink could be used to indicate where workers of another particular nature (e.g. plumbers) are to secure their fixings in a concrete substrate (e.g. where water pipes are to be hung). In the case of the third embodiment heretofore described just the insert 290 might be coloured for such reasons.

In some embodiments the aforementioned large webs are configured such that after the anchor assembly of which they form part has been secured to a form board, prior to concrete pouring, the upper end of the large webs is located further from the form board than the top side of the support member. In other words, looking at FIG. 6, in some embodiments the upper end of the large webs (151 in FIG. 6) are further from the form board 112 than the top side of the support member (180 in FIG. 6), which assists in guiding rebar features over the anchor assembly upon inadvertent contact therewith.

It will be appreciated that whilst various aspects and embodiments of the present invention have heretofore been described, the scope of the present invention is not limited thereto and instead extends to encompass all alternations and modifications thereto which fall within the spirit and scope of the appended claims.

For example the insert 290 of the third embodiment may be provided with another variety of closure member instead of the specific type described and illustrated in the drawings. For example the insert 290 could be provided with a different variety of closure member such as a closure member of the type in FIGS. 15 to 17 or FIGS. 18 to 21.

We claim:

1. A base member for cooperating with a support member and at least one fixing member to form an anchor assembly mountable to a form board on which wet concrete is poured during formation of a concrete substrate, *the support member having a central threaded bore,* the base member comprising:

a mounting portion for positioning the anchor assembly on the form board [prior to inserting the fixing members into the form board];

an aperture having first and second generally opposed ends, the first end being open to facilitate insertion of the support member into the aperture; and a barrier reconfigurable in use from a first configuration, in which the barrier [restricts] *extends over the second end of the aperture to restrict* ingress of *the* wet concrete into contact with *the central threaded bore of* the support member via the second end of the aperture, to a second configuration different from the first configuration, in which *at least a portion of* the barrier [allows] *is removed to allow* an object to extend via the second end of the aperture into contact with *the central threaded bore of* the support member.

2. [The base member as claimed in claim 1] *A base member for cooperating with a support member and at least one fixing member to form an anchor assembly mountable to a form board on which wet concrete is poured during formation of a concrete substrate, the base member comprising:*

*a mounting portion for positioning the anchor assembly on the form board;*

*an aperture having first and second generally opposed ends, the first end being open to facilitate insertion of the support member into the aperture; and*

*a barrier reconfigurable in use from a first configuration, in which the barrier extends over the second end of the aperture to restrict ingress of the wet concrete into contact with the support member via the second end of the aperture, to a second configuration different from the first configuration, in which at least a portion of the barrier is removed to allow an object to extend via the second end of the aperture into contact with the support member*, wherein the barrier comprises a plurality of segments that cooperate to restrict passage of *the* wet concrete in the first configuration and wherein adjacent said plurality of segments are arranged to become separated from connection with each other during reconfiguration to the second configuration in use.

3. The base member as claimed in claim 2, wherein the plurality of segments is configured to hinge relative to the mounting portion during reconfiguration of the barrier between the first and second configurations in use.

4. The base member as claimed in claim 3, wherein the barrier has a central member that is configured to detach from engagement with the plurality of segments during reconfiguration of the barrier between the first and second configurations in use.

5. The base member as claimed in claim 1, wherein the barrier is delineated by a line of weakness.

6. The base member as claimed in claim 1, wherein the base member includes at least one slot delineating the barrier.

7. [The base member as claimed in claim 1] *A base member for cooperating with a support member and at least one fixing member to form an anchor assembly mountable to a form board on which wet concrete is poured during formation of a concrete substrate, the base member comprising:*

*a mounting portion for positioning the anchor assembly on the form board;*

*an aperture having first and second generally opposed ends, the first end being open to facilitate insertion of the support member into the aperture; and*

*a barrier reconfigurable in use from a first configuration, in which the barrier restricts ingress of the wet concrete into contact with the support member via the second end of the aperture, to a second configuration different from the first configuration, in which the barrier allows an object to extend via the second end of the aperture into contact with the support member*, wherein the barrier comprises a frangible part of the base member.

8. [The base member as claimed in claim 1] *A base member for cooperating with a support member and at least one fixing member to form an anchor assembly mountable to a form board on which wet concrete is poured during formation of a concrete substrate, the base member comprising:*

*a mounting portion for positioning the anchor assembly on the form board;*

*an aperture having first and second generally opposed ends, the first end being open to facilitate insertion of the support member into the aperture; and*

*a barrier reconfigurable in use from a first configuration, in which the barrier extends over the second end of the aperture to restrict ingress of the wet concrete into contact with the support member via the second end of the aperture, to a second configuration different from the first configuration, in which at least a portion of the barrier is removed to allow an object to extend via the second end of the aperture into contact with the support member*, wherein the barrier [is formed as an integral part of] *and* the base member *form a single piece.*

9. [The base member as claimed in claim 1] *A base member for cooperating with a support member and at least one fixing member to form an anchor assembly mountable to a form board on which wet concrete is poured during formation of a concrete substrate, the base member comprising:*

*a mounting portion for positioning the anchor assembly on the form board;*

*an aperture having first and second generally opposed ends, the first end being open to facilitate insertion of the support member into the aperture; and*

*a barrier reconfigurable in use from a first configuration, in which the barrier extends over the second end of the aperture to restrict ingress of the wet concrete into contact with the support member via the second end of the aperture, to a second configuration different from the first configuration, in which at least a portion of the barrier is removed to allow an object to extend via the second end of the aperture into contact with the support member*, wherein the mounting portion includes a removable insert and the barrier is provided on the removable insert.

10. The base member as claimed in claim 9, wherein the removable insert includes at least one protuberance and the mounting portion includes at least one opening in which the protuberance locates to indicate correct placement of the base member.

11. The base member as claimed in claim 1, wherein the aperture includes at least one channel to allow evacuation of air during insertion of the support member.

12. The base member as claimed in claim 1, wherein [the] *an* interior of the aperture narrows at or towards the second end to define a shoulder against which the support member bears.

13. The base member as claimed in claim 1, further comprising at least one reinforcement web arranged between the mounting portion and a main guide defining at least part of the aperture.

14. The base member as claimed in claim 1, wherein the aperture includes at least one rib adapted for engagement with the support member.

15. The base member as claimed in claim 1, wherein the mounting portion has an underside provided with a shallow recess which is arranged to diminish as the base member is fastened to the form board.

[16. A east in place anchor assembly comprising:

a base member having a mounting portion, the base member also having an aperture and a barrier arranged in a first configuration for restricting ingress of wet concrete along the length of the aperture after concrete pouring; and a support member located in the aperture of the base member and provided with attachment means accessible through the second end of the aperture upon reconfiguration of the barrier from the first to a second configuration different from the first configuration.]

*17. The base member as claimed in claim 9, wherein a portion of the removable insert remains coupled to the mounting portion in the second configuration.*

*18. The base member as claimed in claim 9, wherein the removable insert is fitted to an underside of the mounting portion.*

*19. The base member as claimed in claim 9, wherein the removable insert is at least partially received in a shallow recess of an underside of the mounting portion.*

*20. The base member as claimed in claim 19, wherein the removable insert is arranged to recede into the shallow recess of the underside as the base member is fastened to the form board.*

*21. A cast in place anchor assembly mountable to a form board on which wet concrete is poured during formation of a concrete substrate, the cast in place anchor assembly comprising:*

*a base member including:*

*a mounting portion having an underside;*

*an aperture extending from the mounting portion, and the aperture having a lower end and an upper end; and*

*a removable insert coupled to the mounting portion;*

*a support member having a lower end received in the aperture of the base member through the upper end of the aperture; and*

*a fixing member supported by the base member and being couplable to the form board to mount the cast in place anchor assembly to the form board with the underside of the mounting portion of the base member against the form board,*

*wherein the removable insert is movable from an extended position in which the removable insert extends outwardly lower than the underside of the mounting portion, to a retracted position in which the removable insert does not extend outwardly lower than the underside of the mounting portion, and*

*wherein the removable insert comprises a barrier extending over the lower end of the aperture and the barrier is frangible to enable the barrier to be reconfigured in use from a first configuration in which the barrier restricts access to the lower end of the support member through the lower end of the aperture, to a second configuration that is different from the first configuration, and in which the barrier permits access to the lower end of the support member through the lower end of the aperture.*

*22. The cast in place anchor assembly as claimed in claim 21, wherein a portion of the removable insert remains coupled to the mounting portion in the second configuration.*

*23. The cast in place anchor assembly as claimed in claim 21, wherein the removable insert is fitted to the underside of the mounting portion.*

*24. The cast in place anchor assembly as claimed in claim 21, wherein the removable insert is at least partially received in a shallow recess of the underside.*

*25. The cast in place anchor assembly as claimed in claim 24, wherein the removable insert is arranged to recede into the shallow recess of the underside as the base member is fastened to the form board.*

*26. The cast in place anchor assembly as claimed in claim 21, wherein the barrier comprises a plurality of segments that cooperate to restrict passage of the wet concrete in the first configuration and wherein adjacent said plurality of segments are arranged to become separated from connection with each other during reconfiguration to the second configuration in use.*

*27. The cast in place anchor assembly as claimed in claim 26, wherein the plurality of segments is configured to hinge relative to the mounting portion during reconfiguration of the barrier between the first and second configurations in use.*

*28. The cast in place anchor assembly as claimed in claim 21, wherein the barrier is delineated by a line of weakness.*

*29. A cast in place anchor assembly mountable to a form board on which wet concrete is poured during formation of a concrete substrate, the cast in place anchor assembly comprising:*

*a base member including:*

*a mounting portion having an underside;*

*an aperture extending from the mounting portion, and the aperture having a lower end and an upper end; and*

*a removable insert coupled to the mounting portion;*

*a support member having a lower end received in the aperture of the base member through the upper end of the aperture; and*

*a fixing member supported by the base member and couplable to the form board to mount the cast in place anchor assembly to the form board with the underside of the mounting portion of the base member against the form board,*

*wherein the removable insert has both an inner central portion and an outer peripheral portion that surrounds the inner central portion, the inner central portion of the removable insert forms a barrier extending over the lower end of the aperture and the outer peripheral portion of the removable insert has an outer diameter that is greater than a diameter of the aperture that is sized to retain the support member, and*

*wherein the barrier is frangible to enable the barrier to be reconfigured in use from a first configuration in which*

*the barrier restricts access to the lower end of the support member through the lower end of the aperture, to a second configuration that is different from the first configuration, and in which the barrier permits access to the lower end of the support member through the lower end of the aperture.*

*30. The cast in place anchor assembly as claimed in claim 29, wherein at least a portion of the outer peripheral portion of the removable insert remains coupled to the mounting portion in the second configuration.*

*31. The cast in place anchor assembly as claimed in claim 29, wherein the removable insert is fitted to the underside of the mounting portion.*

*32. The cast in place anchor assembly as claimed in claim 29, wherein the removable insert is at least partially received in a shallow recess of the underside.*

*33. The cast in place anchor assembly as claimed in claim 32, wherein the removable insert is arranged to recede into the shallow recess of the underside as the base member is fastened to the form board.*

*34. The cast in place anchor assembly as claimed in claim 29, wherein the barrier comprises a plurality of segments that cooperate to restrict passage of the wet concrete in the first configuration and wherein adjacent said plurality of segments are arranged to become separated from connection with each other during reconfiguration to the second configuration in use.*

*35. The cast in place anchor assembly as claimed in claim 34, wherein the plurality of segments is configured to hinge relative to the mounting portion during reconfiguration of the barrier between the first and second configurations in use.*

*36. The cast in place anchor assembly as claimed in claim 29, wherein the barrier is delineated by a line of weakness.*

*37. A cast in place anchor assembly mountable to a form board on which wet concrete is poured during formation of a concrete substrate, the cast in place anchor assembly comprising:*

*a base member including:*

*a mounting portion having a topside and an underside;*

*a support guide extending from the topside of the mounting portion with a support aperture extending through the support guide, the support aperture having a lower end and an upper end;*

*a plurality of fixing guides extending from the topside of the mounting portion, each fixing guide having a fixing aperture therethrough;*

*a plurality of first radial reinforcement webs, each first radial reinforcement web extending from the topside of the mounting portion and extends radially outwardly from one of the fixing guides;*

*a plurality of second radial reinforcement webs, each second radial reinforcement web extending from the topside of the mounting portion and extends radially outwardly from the support guide at a location spaced apart from the fixing guides around a perimeter of the support guide; and*

*a barrier;*

*a support member having a lower end received in the support aperture of the base member through the upper end of the support aperture; and*

*a fixing member received in each of the fixing guides and being couplable to the form board to mount the cast in place anchor assembly to the form board,*

*wherein the barrier is reconfigurable in use from a first configuration in which the barrier restricts access to the lower end of the support member through the lower end of the support aperture, to a second configuration that is different from the first configuration, and in which the barrier permits access to the lower end of the support member through the lower end of the support aperture.*

*38. The cast in place anchor assembly as claimed in claim 37, wherein each of the plurality of first radial reinforcement webs extends outwardly to a peripheral edge of the mounting portion.*

*39. The cast in place anchor assembly as claimed in claim 37, wherein each of the plurality of second radial reinforcement webs extends outwardly to a peripheral edge of the mounting portion.*

*40. The cast in place anchor assembly as claimed in claim 37, wherein each of the plurality of first radial reinforcement webs and of the plurality of second radial reinforcement webs extends outwardly to a peripheral edge of the mounting portion.*

*41. The cast in place anchor assembly as claimed in claim 37, wherein each of the plurality of first radial reinforcement webs includes a notch at an upper end thereof to receive a head of the support member.*

*42. The cast in place anchor assembly as claimed in claim 37, wherein each of the plurality of second radial reinforcement webs has an outer edge that extends from the topside of the mounting portion and then angles inwardly toward the support guide.*

*43. The cast in place anchor assembly as claimed in claim 37, wherein each of the plurality of first radial reinforcement webs extends from the topside of the mounting portion a greater distance than that of each of the plurality of second radial reinforcement webs.*

*44. The cast in place anchor assembly as claimed in claim 37, wherein each of the plurality of first radial reinforcement webs is aligned with a peak of the support guide and each of the plurality of first radial reinforcement webs is aligned with a trough of the support guide.*

*45. The cast in place anchor assembly as claimed in claim 37, wherein the mounting portion includes a removable insert and the barrier is provided on the removable insert.*

*46. The cast in place anchor assembly as claimed in claim 45, wherein a portion of the removable insert remains coupled to the mounting portion in the second configuration.*

*47. The cast in place anchor assembly as claimed in claim 45, wherein the removable insert is fitted to the underside of the mounting portion.*

*48. The cast in place anchor assembly as claimed in claim 45, wherein the removable insert is at least partially received in a shallow recess of the underside.*

*49. The cast in place anchor assembly as claimed in claim 48, wherein the removable insert is arranged to recede into the shallow recess of the underside as the base member is fastened to the form board.*

*50. The cast in place anchor assembly as claimed in claim 37, wherein the barrier comprises a plurality of segments that cooperate to restrict passage of the wet concrete in the first configuration and wherein adjacent said plurality of segments are arranged to become separated from connection with each other during reconfiguration to the second configuration in use.*

*51. The cast in place anchor assembly as claimed in claim 50, wherein the plurality of segments is configured to hinge relative to the mounting portion during reconfiguration of the barrier between the first and second configurations in use.*

*52. The cast in place anchor assembly as claimed in claim 37, wherein the barrier is delineated by a line of weakness.*

*53. The cast in place anchor assembly as claimed in claim 37, wherein the barrier comprises a frangible part of the base member.*

* * * * *